(12) United States Patent
Asano et al.

(10) Patent No.: US 9,372,059 B2
(45) Date of Patent: Jun. 21, 2016

(54) MICROMETER

(71) Applicant: MITUTOYO CORPORATION, Kanagawa (JP)

(72) Inventors: Yoshiro Asano, Tokyo (JP); Sadayuki Matsumiya, Kanagawa (JP); Shigeru Ohtani, Kanagawa (JP); Atsuya Niwano, Kanagawa (JP); Shozaburo Tsuji, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 67 days.

(21) Appl. No.: 14/473,444

(22) Filed: Aug. 29, 2014

(65) Prior Publication Data

US 2015/0059196 A1  Mar. 5, 2015

(30) Foreign Application Priority Data

Sep. 5, 2013  (JP) .................................. 2013-183783

(51) Int. Cl.
*G01B 3/18* (2006.01)

(52) U.S. Cl.
CPC ...................... *G01B 3/18* (2013.01)

(58) Field of Classification Search
CPC ........................................................ G01B 3/18
USPC ................... 33/813, 819, 829, 831
See application file for complete search history.

(56) References Cited

U.S. PATENT DOCUMENTS

| 5,495,677 | A  * | 3/1996  | Tachikake | G01B 3/18 33/784 |
| 6,243,965 | B1 * | 6/2001  | Zanier    | G01B 3/18 33/705 |
| 2003/0217478 | A1 * | 11/2003 | Matsumiya | B82Y 30/00 33/784 |
| 2005/0166416 | A1 * | 8/2005  | Matsumiya | G01B 3/20 33/755 |
| 2008/0052942 | A1 * | 3/2008  | Kawatoko  | G01B 3/205 33/702 |
| 2008/0250665 | A1 * | 10/2008 | Hayashida | G01B 3/18 33/825 |
| 2010/0024237 | A1 * | 2/2010  | Hayashida | G01B 3/18 33/831 |
| 2011/0252659 | A1 * | 10/2011 | Tsuji     | G01B 3/18 33/815 |
| 2013/0091720 | A1 * | 4/2013  | Hayashida | G01B 3/18 33/819 |
| 2015/0059480 | A1 * | 3/2015  | Dockrey   | G01B 21/04 73/649 |

FOREIGN PATENT DOCUMENTS

JP  A-2011-080977  4/2011

* cited by examiner

*Primary Examiner* — G. Bradley Bennett
(74) *Attorney, Agent, or Firm* — Oliff PLC

(57) ABSTRACT

A micrometer with good usability is provided. A micrometer has a frame with an anvil at one end and a spindle at another end, the spindle moving closer to or further away from the anvil. The frame is covered with a heat shield cover. The heat shield cover has a first anti-slip part. The first anti-slip part preferably has a plurality of protrusions.

8 Claims, 14 Drawing Sheets

MICROMETER

INCORPORATION BY REFERENCE

This application is based upon and claims the benefit of priority from Japanese patent application No. 2013-183783, filed on Sep. 5, 2013, the disclosure of which is incorporated herein in its entirety by reference.

BACKGROUND OF THE INVENTION

1. Field of the Invention

The present invention relates to a micrometer and, for example, to a micrometer having a frame with an anvil at one end and a spindle at the other end, the spindle moving closer to or further away from the anvil.

2. Description of Related Art

The micrometer has a frame with an anvil at one end and a spindle at the other end, where the spindle moves closer to or further away from the anvil as a user holds the frame and rotates a thimble attached to the spindle.

In such a micrometer, it is necessary to suppress the effect of thermal expansion of the frame due to the heat of the hand of a user holding the frame. For example, in the micrometer disclosed in Japanese Unexamined Patent Application Publication No. 2011-80977, the frame is covered with a heat shield.

It is assumed that a micrometer is used in a situation where a user measures the size of an object using a finger with a lubricant such as oil, for example.

However, the heat shield cover of the micrometer disclosed in Japanese Unexamined Patent Application Publication No. 2011-80977 has no anti-slip feature, and it is slippery when a user picks up the heat shield cover. Thus, this micrometer has a room for improvement in usability.

SUMMARY OF THE INVENTION

The present invention has been accomplished to solve the above problem and an object of the present invention is thus to provide a micrometer with good usability.

A micrometer according to one aspect of the invention has a frame with an anvil at one end and a spindle at another end, the spindle moving closer to or further away from the anvil, wherein the frame is covered with a heat shield cover, and the heat shield cover has a first anti-slip part.

In the above-described micrometer, it is preferred that the first anti-slip part has a plurality of protrusions.

In the above-described micrometer, it is preferred that the protrusions are formed like dots, and the plurality of protrusions are arranged regularly or irregularly.

In the above-described micrometer, it is preferred that the protrusions extend in a given direction, and the plurality of protrusions are arranged substantially in parallel.

In the above-described micrometer, it is preferred that the first anti-slip part is provided on the heat shield cover in such a way that a position in a moving direction of the spindle in the micrometer can be specified.

It is preferred that the above-described micrometer further includes a display panel that covers the frame and displays an amount of displacement of the spindle relative to the anvil, and the display panel has a second anti-slip part.

In the above-described micrometer, it is preferred that the second anti-slip part has a plurality of protrusions.

In the above-described micrometer, it is preferred that the protrusions are formed like dots, and the plurality of protrusions are arranged regularly or irregularly.

In the above-described micrometer, it is preferred that the protrusions extend in a given direction, and the plurality of protrusions are arranged substantially in parallel.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Preferred embodiments of the present invention will be described hereinafter with reference to the attached drawings. The present invention is not limited to the below-described embodiments. The following description and the attached drawings are appropriately shortened and simplified to clarify the explanation.

First Embodiment

Figure 1:
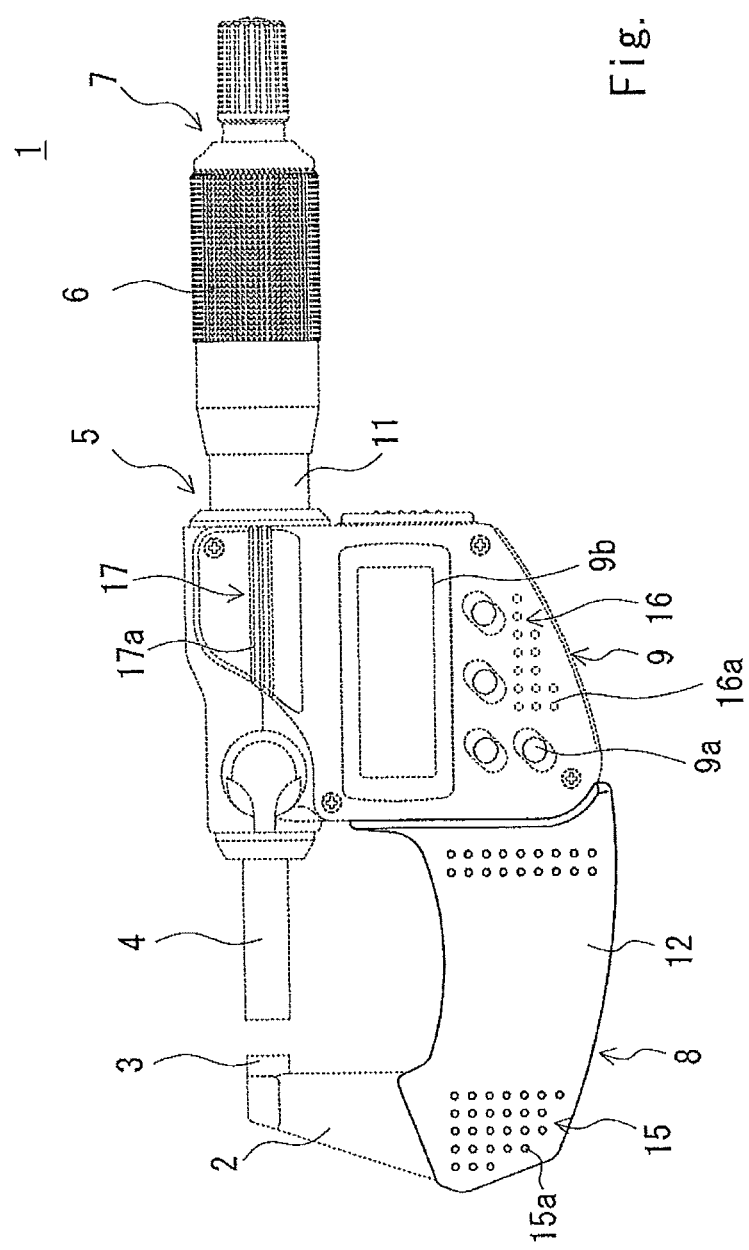
FIG. 1 is a front view showing a micrometer according to a first embodiment.
Figure 2:
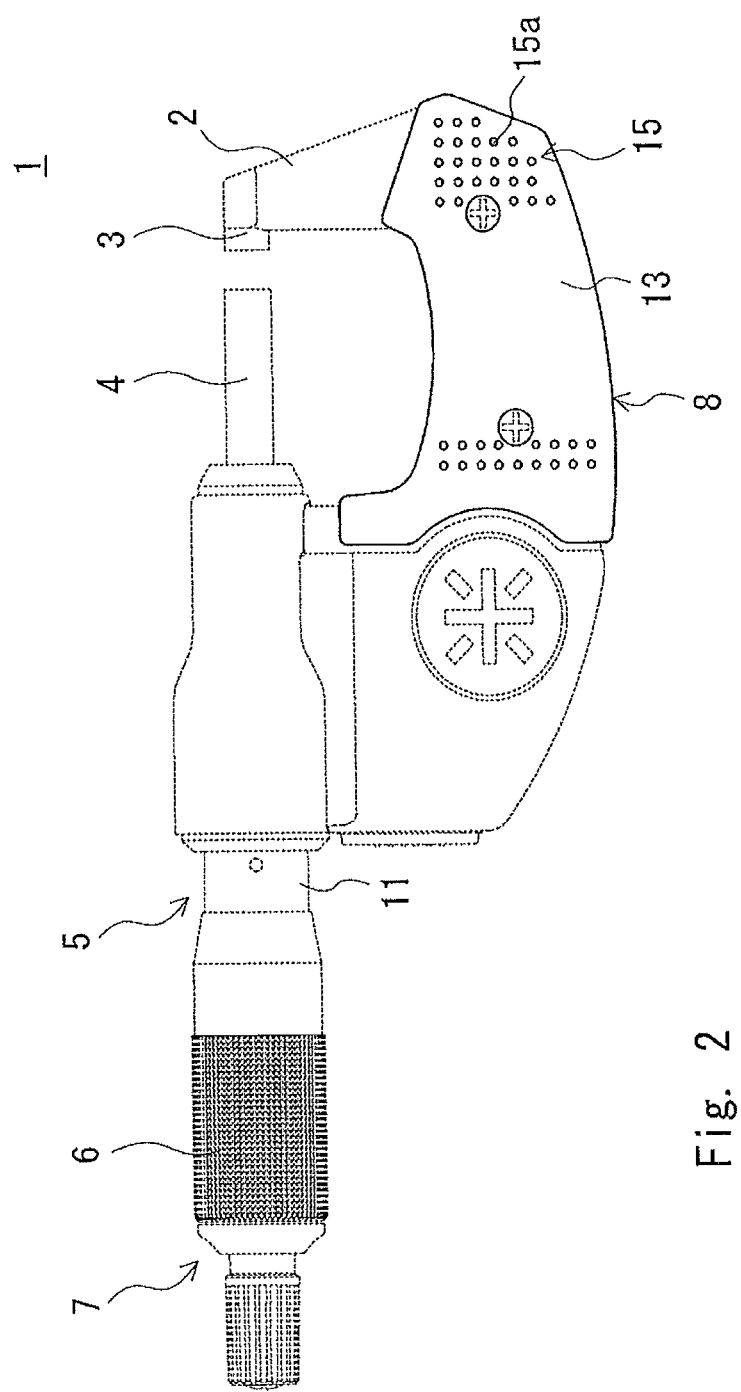
FIG. 2 is a back view showing the micrometer according to the first embodiment.
Figure 3:
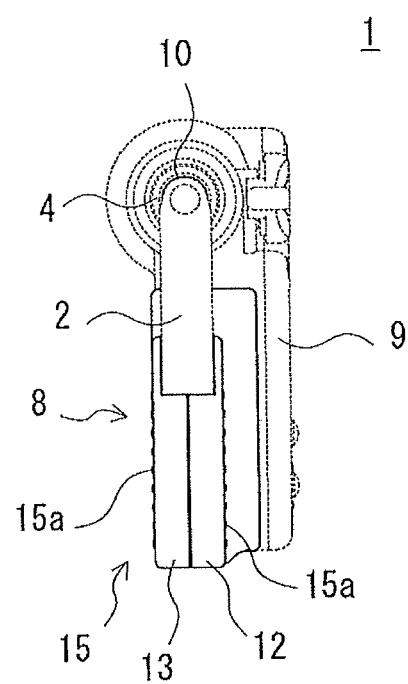
FIG. 3 is a left side view showing the micrometer according to the first embodiment.
Figure 4:
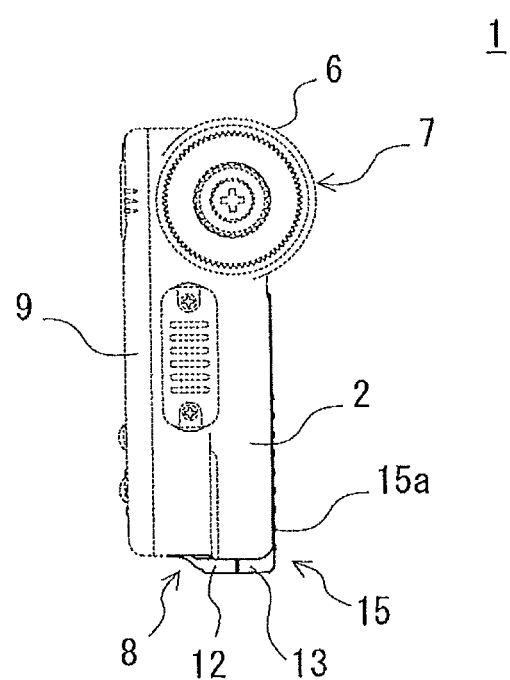
FIG. 4 is a right side view showing the micrometer according to the first embodiment.
Figure 5:
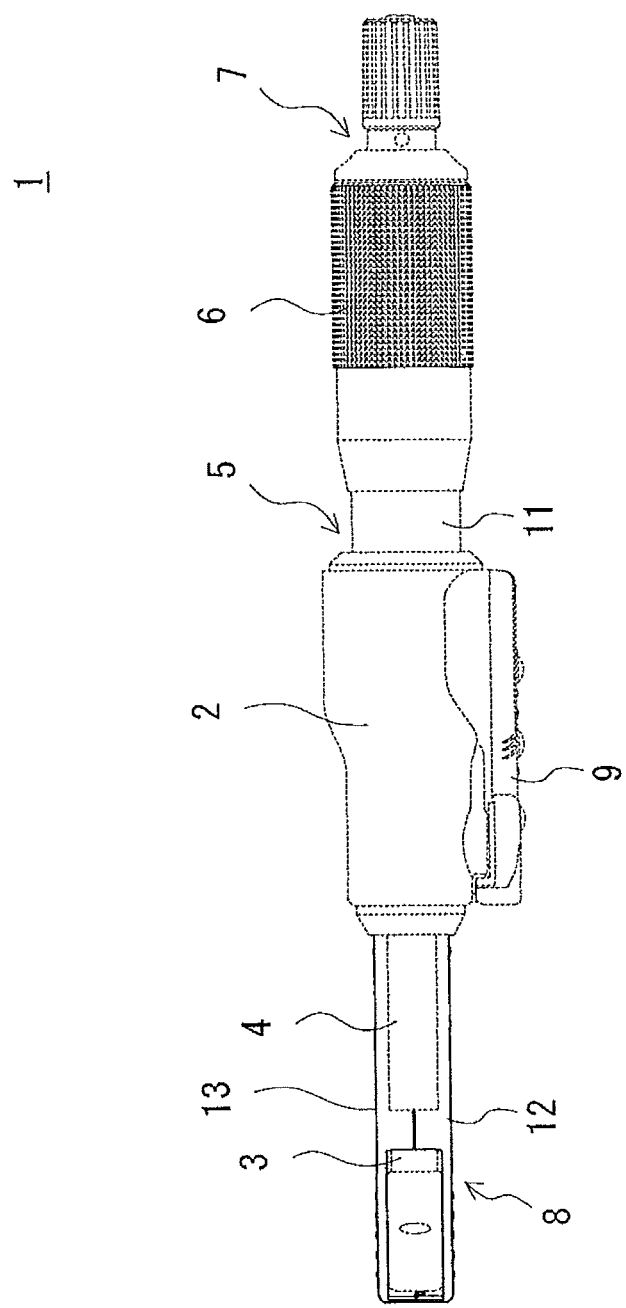
FIG. 5 is a top plan view showing the micrometer according to the first embodiment.
Figure 6:
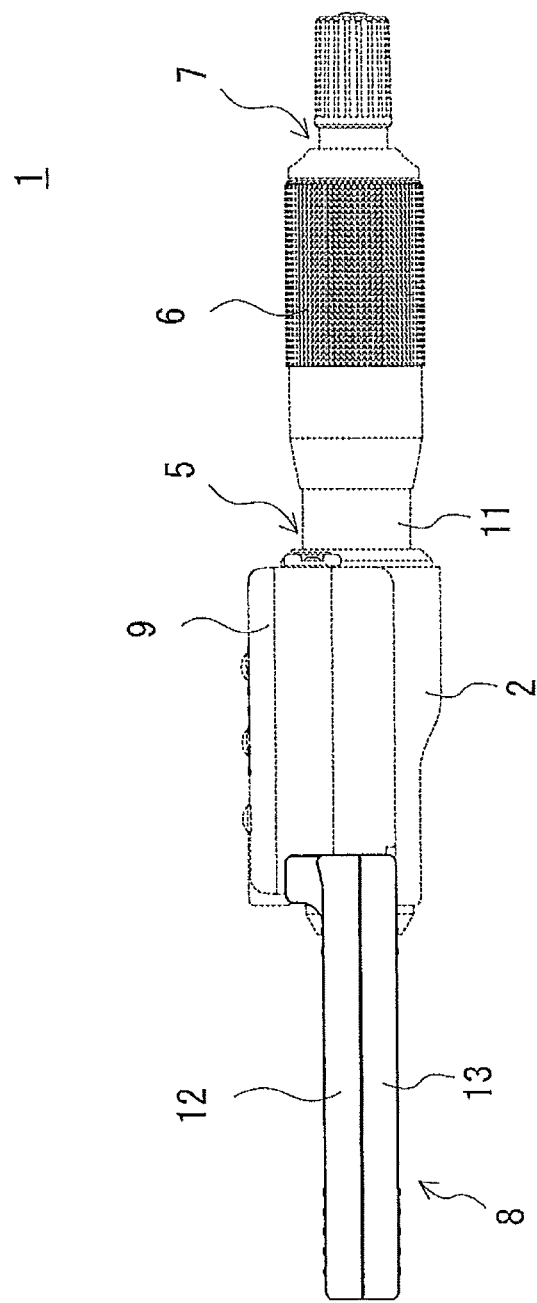
FIG. 6 is a bottom plan view showing the micrometer according to the first embodiment.
Figure 7:
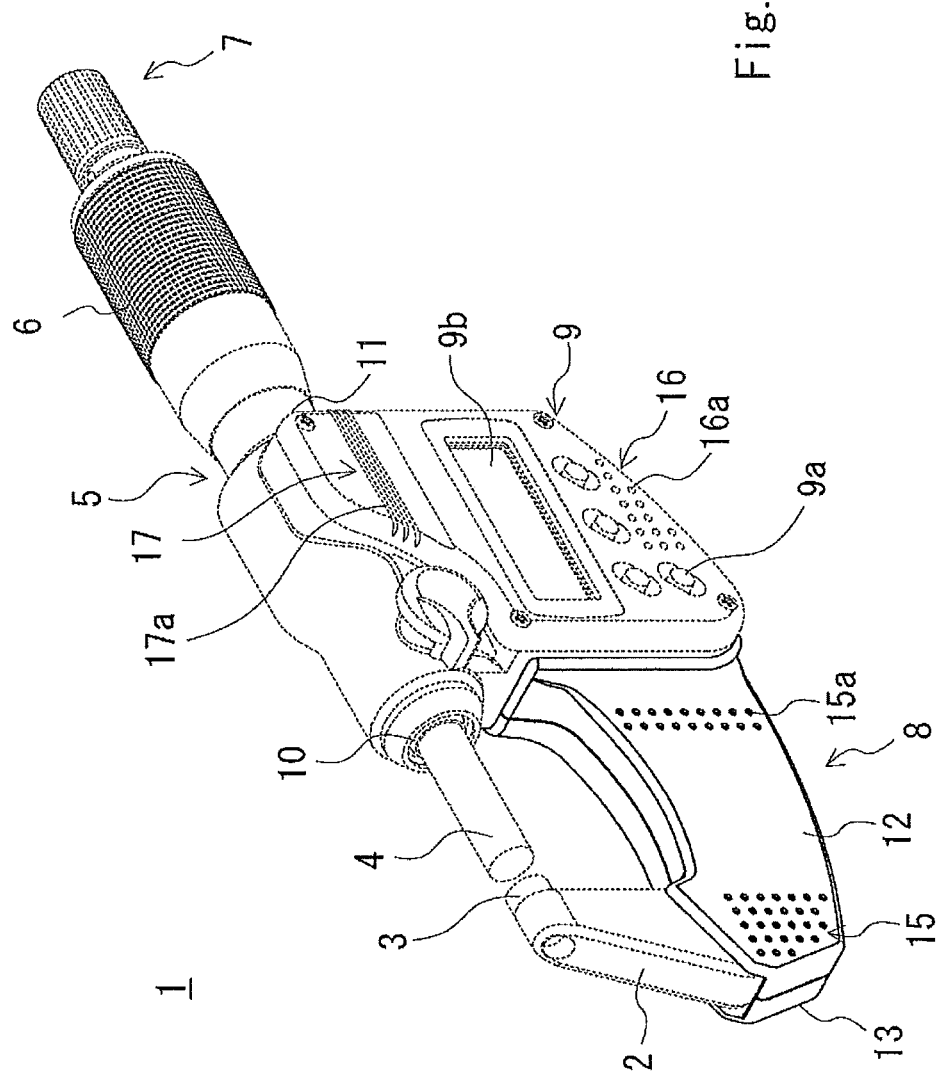
FIG. 7 is a perspective view showing the micrometer according to the first embodiment.

A micrometer according to this embodiment is described hereinafter. First, a basic structure of the micrometer according to this embodiment is described. FIG. 1 is a front view showing a micrometer 1 according to this embodiment. FIG. 2 is a back view showing the micrometer 1 according to this embodiment. FIG. 3 is a left side view showing the micrometer 1 according to this embodiment. FIG. 4 is a right side view showing the micrometer 1 according to this embodiment. FIG. 5 is a top plan view showing the micrometer 1 according to this embodiment. FIG. 6 is a bottom plan view showing the micrometer 1 according to this embodiment. FIG. 7 is a perspective view showing the micrometer 1 according to this embodiment. Note that the illustrated direction of the micrometer 1 is that of one usage and changed depending on usage, Further, to clearly show the heat shield cover, the other parts are shown by a dotted line.

The micrometer 1 includes a frame 2, an anvil 3, a spindle 4, a sleeve 5, a thimble 6, a ratchet mechanism 7, a heat shield cover 8, and a display cover 9.

The frame 2 is substantially U-shaped and made of metal, for example. The anvil 3 is placed at the upper left end of the frame 2. The spindle 4 is basically in a cylindrical column shape and placed coaxially opposite to the anvil 3. The spindle 4 is held at the upper right end of the frame 2 through the sleeve 5, and its left end projects from the upper right end of the frame 2. The spindle 4 moves closer to or further away from the anvil 3.

In the sleeve 5, the left end of an inner sleeve 10 that is basically in a cylindrical hollow shape is fixed to the upper right end of the frame 2. The spindle 4 goes through the inner sleeve 10, and a screw part formed on the outer periphery of the spindle 4 is engaged with a screw part formed on the inner periphery of the inner sleeve 10. On the outer periphery of the inner sleeve 10, an outer sleeve 11 is fixed to cover the inner sleeve 10.

The outer sleeve 11 is basically in a cylindrical hollow shape, and a scale, which is not shown, is present thereon along the moving direction of the spindle 4, which is the longitudinal direction.

The thimble 6 is basically in a cylindrical hollow shape, and it rotatably fits with the outer sleeve 11, covering the outer periphery of the outer sleeve 11. On the thimble 6, a scale, which is not shown, is present in the circumferential direction. The right end of the spindle 4 is attached to the thimble 6, and the spindle 4 moves closer to or further away from the anvil 3 as the thimble 6 turns. At this time, the scale of the thimble 6 and the scale of the outer sleeve 11 indicate the amount of displacement of the spindle 4 relative to the anvil 3.

The ratchet mechanism 7 is placed at the right end of the spindle 4, and it runs idle when a certain amount or more of load is applied to the spindle 4.

The heat shield cover 8 coverts at least a part of the frame 2 which a user picks up. Note that the heat shield cover 8 is described in detail later. The display cover 9 displays the amount of displacement of the spindle 4 relative to the anvil 3 on a display unit 9b in response to a press of an operation button 9a. The display cover 9 is fixed near the upper right end of the frame 2.

Figure 8:
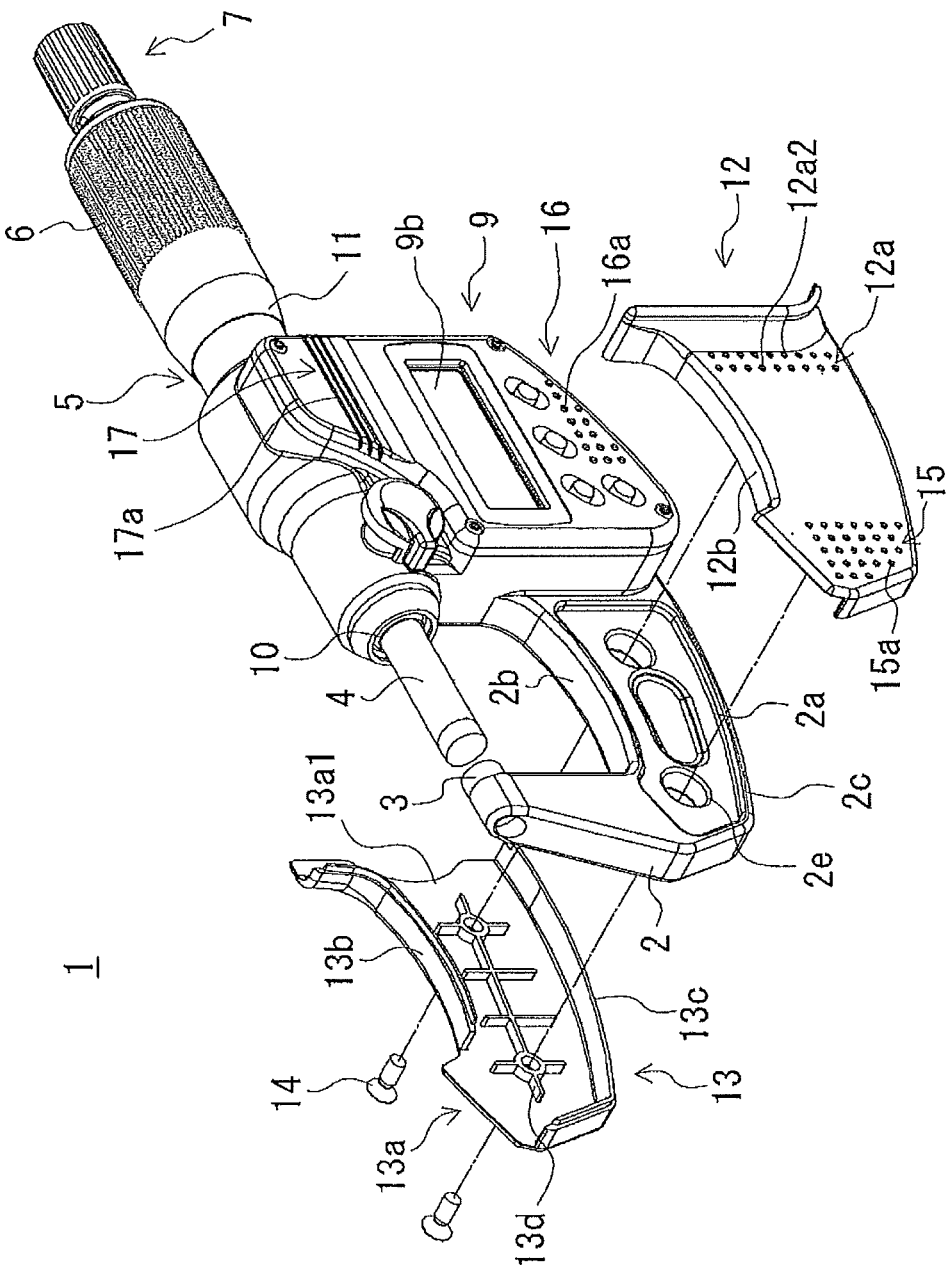
FIG. 8 is a perspective view showing the way a heat shield cover is attached in the micrometer according to the first embodiment.
Figure 9:
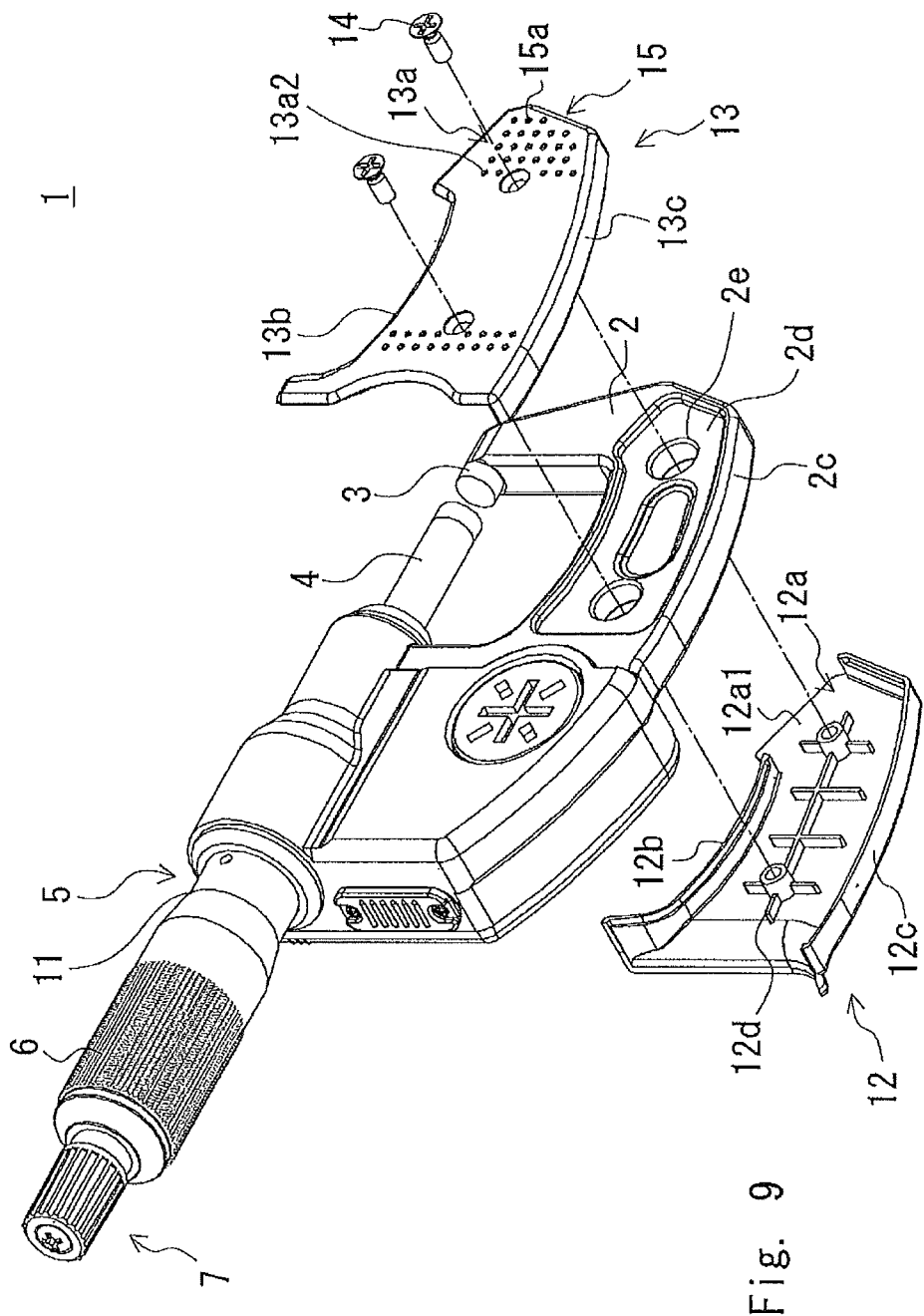
FIG. 9 is another perspective view showing the way a heat shield cover is attached in the micrometer according to the first embodiment.
Figure 10:
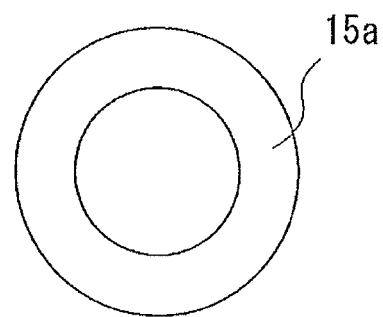
FIG. 10 is a front view showing a shape of a protrusion formed on a heat shield cover.
Figure 11:
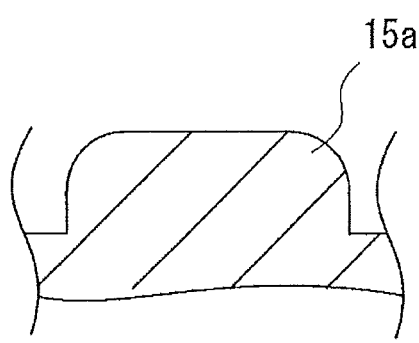
FIG. 11 is a sectional view showing a shape of a protrusion formed on a heat shield cover.

A specific structure of the heat shield cover 8 is described hereinafter. FIG. 8 is a perspective view showing the way the heat shield cover 8 is attached in the micrometer 1 according to this embodiment. FIG. 9 is another perspective view showing the way the heat shield cover 8 is attached in the micrometer 1 according to this embodiment. FIGS. 10 and 11 are views showing the shape of a protrusion formed on the heat shield cover 8.

The heat shield cover 8 includes a first cover member 12 and a second cover member 13. The first cover member 12 and the second cover member 13 are preferably made of a material with a low thermal conductivity, such as resin, for example.

The first cover member 12 and the second cover member 13 cover the lower part of the substantially U-shaped frame 2. The first cover member 12 includes a part 12a that covers one surface 2a of the opposite surfaces in the lower part of the substantially U-shaped frame 2, a part 12b that covers substantially the half of an upper surface 2b in the lower part of the frame 2, and a part 12c that covers substantially the half of an under surface 2c in the lower part of the frame 2.

A rib 12d is provided on a reverse side 12a1 of the part 12a that covers the surface 2a of the frame 2 in the first cover member 12. An air space is thereby created between the reverse side 12a1 of the part 12a of the first cover member 12 that covers the surface 2a of the frame 2 and the surface 2a of the frame 2 when the first cover member 12 is attached to the frame 2, which suppresses heat transfer from the first cover member 12 to the frame 2.

The second cover member 13 includes a part 13a that covers the other surface 2d of the opposite surfaces in the lower part of the substantially U-shaped frame 2, a part 13b that covers substantially the other half of the upper surface 2b in the lower part of the frame 2, and a part 13c that covers substantially the other half of the under surface 2c in the lower part of the frame 2.

A rib 13d is provided also on a reverse side 13a1 of the part 13a that covers the surface 2d of the frame 2 in the second cover member 13. An air space is thereby created between the reverse side 13a1 of the part 13a of the second cover member 13 that covers the surface 2d of the frame 2 and the surface 2d of the frame 2 when the second cover member 13 is attached to the frame 2, which suppresses heat transfer from the second cover member 13 to the frame 2.

The first cover member 12 and the second cover member 13 are placed with the lower part of the substantially U-shaped frame 2 interposed therebetween, and they are attached to the lower part of the frame 2 by inserting a bolt 14 through a through hole of one cover member and a through hole 2e of the frame 2 and then inserting the bolt 14 into a bolt hole formed on the other cover member (note that, however, a fitting structure or the like, for example, may be used instead as long as the first cover member 12 and the second cover member 13 can be fixed).

A user can thereby pick up the heat shield cover 8 and measure the size of an object when measuring the object size, and because the user does not directly touch the frame 2 when measuring the object size, it is possible to suppress the effect of thermal expansion of the frame 2.

The first cover member 12 or the second cover member 13 has an anti-slip part 15. A protrusion 15a of this embodiment is semisphere-shaped. The height, width and the like of the protrusion 15a are set arbitrarily to suitably provide the anti-slip capability.

A plurality of protrusions 15a are regularly or irregularly arranged substantially entirely or partly on a surface 12a2 of the part 12a that covers the surface 2a of the frame 2 in the first cover member 12 or a surface 13a2 of the part 13a that covers the surface 2d of the frame 2 in the second cover member 13.

The plurality of protrusions 15a according to this embodiment are arranged in matrix in two areas separated left and right from each other on the surface 12a2 of the part 12a that covers the surface 2a of the frame 2 in the first cover member 12 and the surface 13a2 of the part 13a that covers the surface 2d of the frame 2 in the second cover member 13. Specifically, the plurality of protrusions 15a are arranged at intersections of a virtual lattice.

In this manner, because the heat shield cover 8 is provided with the anti-slip part 15, even when a user picks up the heat shield cover 8 by the hand with a lubricant such as oil, it is possible to prevent slippage, thereby improving the usability of the micrometer 1.

In the case where the plurality of protrusions 15a are arranged partly as described above, a user can recognize the direction and a measurement position of the micrometer 1 by their arrangement pattern, arrangement area and the like. For example, the anti-slip part 15 is provided to be separated left and right in this embodiment in this embodiment, and if the space therebetween corresponds to the measurement position of an object, it is possible to let a user recognize the measurement position of the object.

It is preferred that the display cover 9 also has anti-slip parts 16 and 17. The anti-slip part 16 has dot-like protrusions 16a, just like the anti-slip part 15, and is placed below the display unit 9b of the display cover 9. Further, the anti-slip part 17 has protrusions 17a in a substantially tunnel shape extending horizontally, and the protrusions 17a are arranged one above the other substantially in parallel with a space therebetween above the display unit 9b of the display cover 9. Thus, even when a user picks up the display cover 9 by the hand with a lubricant such as oil, it is possible to prevent slippage, thereby improving the usability of the micrometer 1.

Other Embodiments

Figure 12:
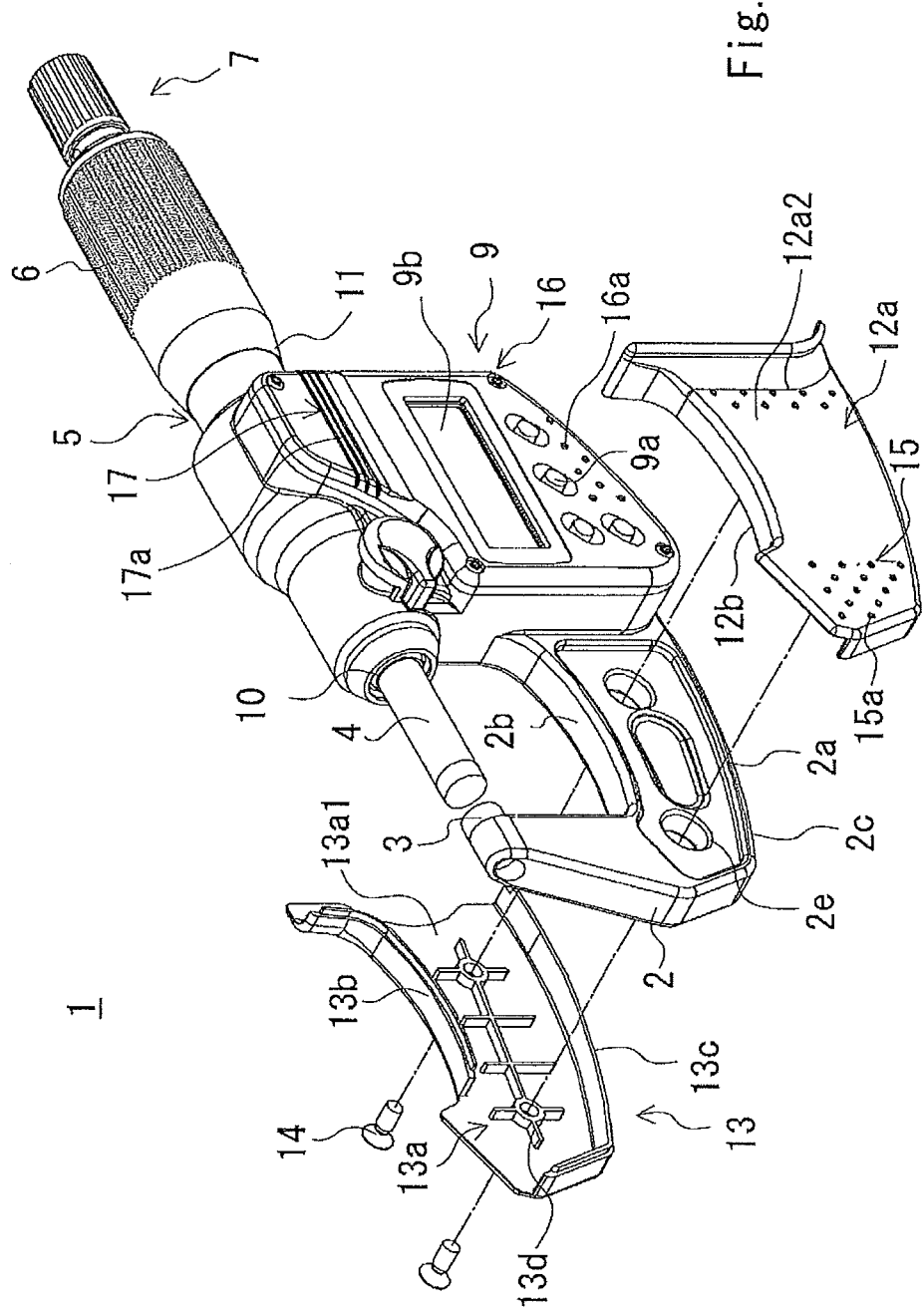
FIG. 12 is a perspective view showing the way a heat shield cover is attached in a micrometer according to another embodiment.
Figure 13:
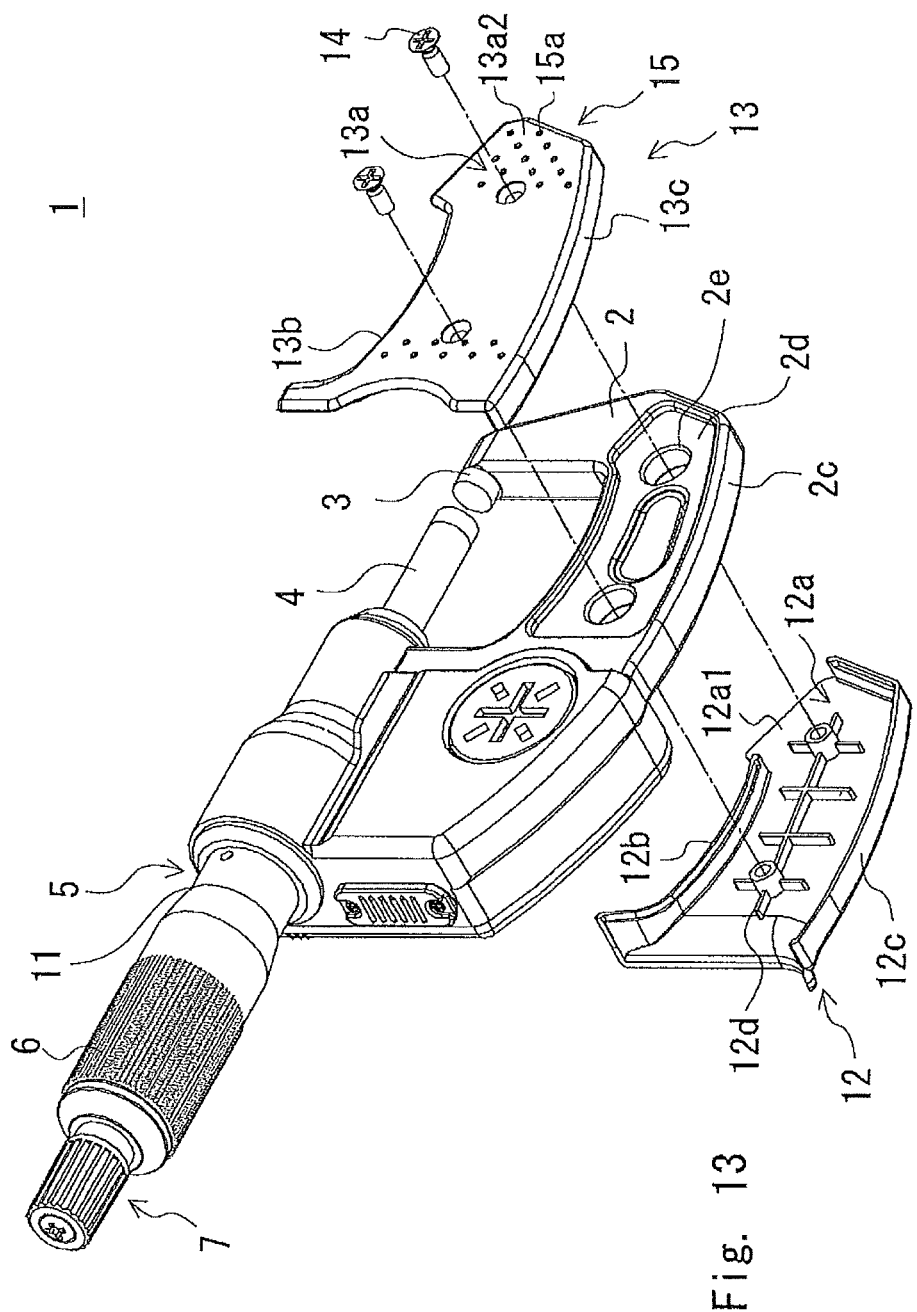
FIG. 13 is another perspective view showing the way a heat shield cover is attached in a micrometer according to another embodiment.

FIGS. 12 and 13 show other forms of the heat shield cover 8. As shown in FIGS. 12 and 13, the plurality of dot-like protrusions 15a may be arranged in a staggered manner, and the micrometer may be formed in combination with the display cover 9 of the first embodiment. Further, the plurality of dot-like protrusions 16a on the surface of the display cover 9 may be also arranged in a staggered manner, and the micrometer may be formed in combination with the heat shield cover 8 of the first embodiment.

Figure 14:
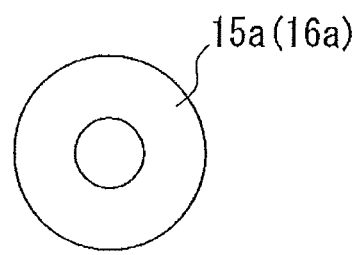
FIG. 14 is a front view showing another shape of a protrusion formed on a heat shield cover or a display panel.
Figure 15:
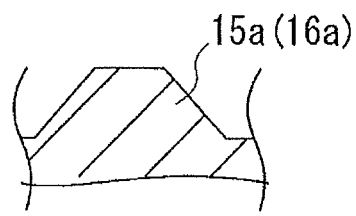
FIG. 15 is a sectional view showing another shape of a protrusion formed on a heat shield cover or a display panel.

Further, FIGS. 14 and 15 show different shapes of the protrusion 15a (16a). As shown in FIGS. 14 and 15, the protrusion 15a (16a) may be substantially cone-shaped having a horizontal surface at the top.

Figure 16:
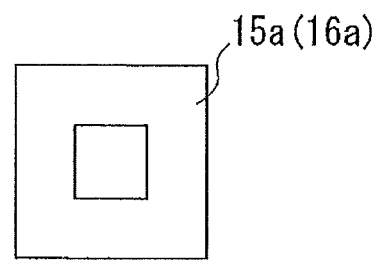
FIG. 16 is a front view showing another shape of a protrusion formed on a heat shield cover or a display panel.
Figure 17:
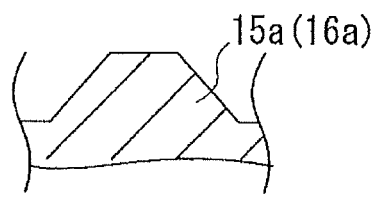
FIG. 17 is a sectional view showing another shape of a protrusion formed on a heat shield cover or a display panel.

Further, FIGS. 16 and 17 show different shapes of the protrusion 15a (16a). As shown in FIGS. 16 and 17, the protrusion 15a (16a) may be substantially square pyramid-shaped having a horizontal surface at the top.

Figure 18:
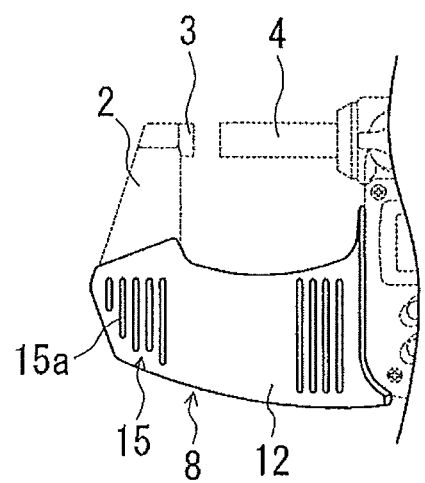
FIG. 18 is a front view showing another shape of a protrusion formed on a heat shield cover.

Further, FIG. 18 shows a different shape of the protrusion 15a. As shown in FIG. 18, the protrusion 15a may be substantially tunnel-shaped extending vertically (or horizontally or obliquely), and the plurality of protrusions 15 may be arranged substantially in parallel.

In brief, the protrusion 15a (16a) may have any shape that suitably provides the anti-slip capability, and it may be substantially polygonal pyramid-shaped, cylindrical column-shaped or polygonal column-shaped, for example, or continuous curve-shaped (for example, wave-shaped) when viewed from the protruding direction of the protrusion 15a (16a). Further, the cross-sectional shape of the protrusion 15a (16a) extending in a given direction is not the substantially tunnel shape, and it may be a polygonal shape. Furthermore, the protrusions 15a (16a) of different shapes may be provided in combination. In addition, recesses, not protrusions, may be provided.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A micrometer having a frame with an anvil at one end and a spindle at another end, the spindle moving closer to or further away from the anvil, comprising:
    a heat shield cover that covers the frame, wherein
    the heat shield cover has first ant-slip parts, and
    the first anti-slip parts are disposed with a space therebetween in a moving direction of the spindle and the space corresponds to a measurement position of an object to be measured in the moving direction of the spindle.

2. The micrometer according to claim 1, wherein
    the first anti-slip part has a plurality of protrusions.

3. The micrometer according to claim 2, wherein
    the protrusions are formed like dots, and the plurality of protrusions are arranged regularly or irregularly.

4. The micrometer according to claim 2, wherein
    the protrusions extend in a given direction, and the plurality of protrusions are arranged substantially in parallel.

5. The micrometer according to claim 1, comprising:
    a display panel that covers the frame and displays an amount of displacement of the spindle relative to the anvil, wherein
    the display panel has a second anti-slip part.

6. The micrometer according to claim 5, wherein
    the second anti-slip part has a plurality of protrusions.

7. The micrometer according to claim 6, wherein
    the protrusions are formed like dots, and the plurality of protrusions are arranged regularly or irregularly.

8. The micrometer according to claim 6, wherein
    the protrusions extend in a given direction, and the plurality of protrusions are arranged substantially in parallel.

* * * * *